United States Patent
Chen et al.

(10) Patent No.: US 9,894,028 B2
(45) Date of Patent: Feb. 13, 2018

(54) PERSONALIZED CROSS SESSION DIVERSITY

(71) Applicant: Microsoft Technology Licensing, LLC, Redmond, WA (US)

(72) Inventors: Boyi Chen, Sunnyvale, CA (US); Pannagadatta K. Shivaswamy, Sunnyvale, CA (US); Qi He, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 15/056,924

(22) Filed: Feb. 29, 2016

(65) Prior Publication Data
US 2017/0063774 A1   Mar. 2, 2017

Related U.S. Application Data

(60) Provisional application No. 62/212,535, filed on Aug. 31, 2015.

(51) Int. Cl.
| G06F 15/16 | (2006.01) |
| H04L 12/58 | (2006.01) |
| G06Q 50/00 | (2012.01) |
| H04L 29/08 | (2006.01) |
| H04L 29/06 | (2006.01) |
| G06F 17/30 | (2006.01) |

(52) U.S. Cl.
CPC ........... *H04L 51/32* (2013.01); *G06Q 50/01* (2013.01); *H04L 29/06* (2013.01); *H04L 29/08072* (2013.01); *H04L 51/16* (2013.01); *H04L 67/306* (2013.01); *G06F 17/30867* (2013.01)

(58) Field of Classification Search
CPC .................. H04L 29/08072; H04L 29/06
USPC .................. 709/220, 223, 227, 228
See application file for complete search history.

(56) References Cited

U.S. PATENT DOCUMENTS

| 9,081,859 | B2 * | 7/2015 | Mohan | G06F 17/30867 |
| 9,727,818 | B1 * | 8/2017 | Liu | G06N 5/02 |
| 2008/0091524 | A1 * | 4/2008 | Yan | G06Q 30/02 705/14.45 |
| 2011/0153521 | A1 * | 6/2011 | Green | G06Q 40/06 705/36 R |
| 2014/0289237 | A1 * | 9/2014 | Wang | G06Q 30/02 707/727 |
| 2016/0379250 | A1 * | 12/2016 | Bhalgat | G06Q 30/0255 705/14.53 |

* cited by examiner

*Primary Examiner* — Khanh Dinh
(74) *Attorney, Agent, or Firm* — Schwegman Lundberg & Woessner, P.A.

(57) ABSTRACT

A system and method for personalizing cross session diversity is disclosed. The system receives a member opportunity request. In response, the system generates a list of members in response to the received member opportunity request, wherein the list of members is determined based on member profile data stored at a social networking system. For each member in the generated list of members, the system generates a profile value score based on the stored member profile data. The system ranks the members of the generated list at least in part based on the generated profile value scores. The system then selects one or more members in the list of members based on the ranking of members in the generated list.

20 Claims, 11 Drawing Sheets

| SESSION 1<br>13 HOURS AGO ⟍502 | SESSION 2<br>11 HOURS AGO ⟍506 | SESSION 3<br>4 HOURS AGO ⟍510 | CURRENT SESSION<br>RIGHT NOW ⟍514 | PREVIOUS DISPLAYED<br>COUNT ⟍520 |
|---|---|---|---|---|
| MEMBER E<br>504-1 | MEMBER W<br>508-1 | MEMBER P<br>512-1 | MEMBER L<br>516-1 | 4 |
| MEMBER L<br>504-2 | MEMBER B<br>508-2 | MEMBER S<br>512-2 | MEMBER R<br>516-2 | 0 |
| MEMBER O<br>504-3 | MEMBER Y<br>508-3 | MEMBER D<br>512-3 | MEMBER A<br>516-3 | 2 |
| MEMBER T<br>504-4 | MEMBER U<br>508-4 | MEMBER L<br>512-4 | MEMBER M<br>516-4 | 0 |
| MEMBER H<br>504-5 | MEMBER H<br>508-5 | MEMBER F<br>512-5 | MEMBER H<br>516-5 | 3 |
| MEMBER Y<br>504-6 | MEMBER I<br>508-6 | MEMBER A<br>512-6 | MEMBER V<br>516-6 | 0 |
| MEMBER Q<br>504-7 | MEMBER A<br>508-7 | MEMBER C<br>512-7 | MEMBER N<br>516-7 | 1 |
| MEMBER P<br>504-8 | MEMBER L<br>508-8 | MEMBER H<br>512-8 | MEMBER Y<br>516-8 | 2 |
| MEMBER L<br>504-9 | MEMBER N<br>508-9 | MEMBER X<br>512-9 | MEMBER I<br>516-9 | 1 |

FIGURE 5A

| ORIGINAL RANKING ORDER 524 | PREVIOUS DISPLAYED COUNT 520 | ORIGINAL RELEVANCE SCORE 522 | DISCOUNT FACTOR 526 |
|---|---|---|---|
| MEMBER L 516-1 | 4 | 0.9 | 0.6 |
| MEMBER R 516-2 | 0 | 0.8 | 1.0 |
| MEMBER A 516-3 | 2 | 0.7 | 0.8 |
| MEMBER M 516-4 | 0 | 0.6 | 1.0 |
| MEMBER H 516-5 | 3 | 0.5 | 0.7 |
| MEMBER V 516-6 | 0 | 0.4 | 1.0 |
| MEMBER N 516-7 | 1 | 0.3 | 0.9 |
| MEMBER Y 516-8 | 2 | 0.2 | 0.8 |
| MEMBER I 516-9 | 1 | 0.1 | 0.9 |

| FINAL RANKING ORDER 530 | DISCOUNT RELEVANCE SCORE 524 |
|---|---|
| MEMBER R 516-2 | 0.8 |
| MEMBER M 516-4 | 0.60 |
| MEMBER A 516-3 | 0.56 |
| MEMBER L 516-1 | 0.54 |
| MEMBER V 516-6 | 0.4 |
| MEMBER H 516-5 | 0.35 |
| MEMBER N 516-7 | 0.27 |
| MEMBER Y 516-8 | 0.16 |
| MEMBER I 516-9 | 0.09 |

FIGURE 5B

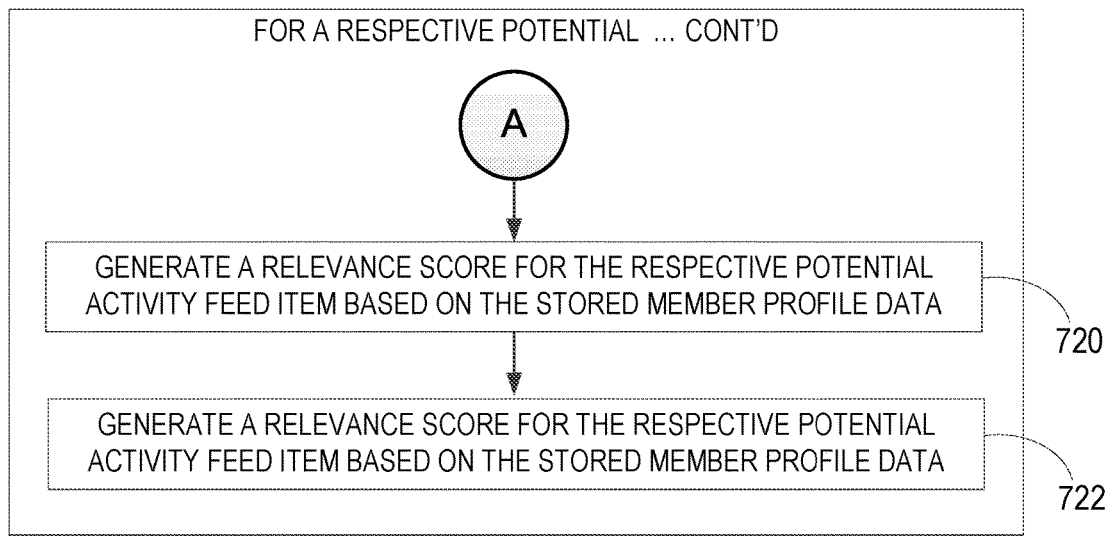
FIGURE 7B    700

PERSONALIZED CROSS SESSION DIVERSITY

TECHNICAL FIELD

The disclosed example embodiments relate generally to the field of data personalization and, in particular, to personalizing activity feed item feeds.

BACKGROUND

The rise of the computer age has resulted in increased access to personalized services online. As the cost of electronics and networking services drops, many services can be provided remotely over the Internet. For example, entertainment has increasingly shifted to the online space with companies such as Netflix and Amazon streaming television shows and movies to members at home. Similarly, electronic mail (e-mail) has reduced the need for letters to be physically delivered. Instead, messages are sent over networked systems almost instantly.

Another service provided over networks is social networking. Large social networks allow members to connect with each other and share information. As the number of members grows, social networks need to prioritize which information to share with each member. These determinations can be made based on the characteristics of the receiving member, the information itself, or the characteristics of the sharing member.

Social networks enable members to view information shared by other members, especially members that are connected to each other through the social network. To determine which information to share with a member (e.g., how to prioritize information when there is far to much total information to be displayed) the social network analyzes the relevance of information and orders it accordingly.

DESCRIPTION OF THE DRAWINGS

Some example embodiments are illustrated by way of example and not limitation in the figures of the accompanying drawings, in which:

FIGS. 5A and 5B depict example of a data structure for increasing cross session diversity in accordance with some example embodiments.

FIGS. 7A and 7B are flow diagrams illustrating a method, in accordance with some example embodiments, for increasing activity feed diversity across sessions.

Like reference numerals refer to corresponding parts throughout the drawings.

DETAILED DESCRIPTION

Figure 1:
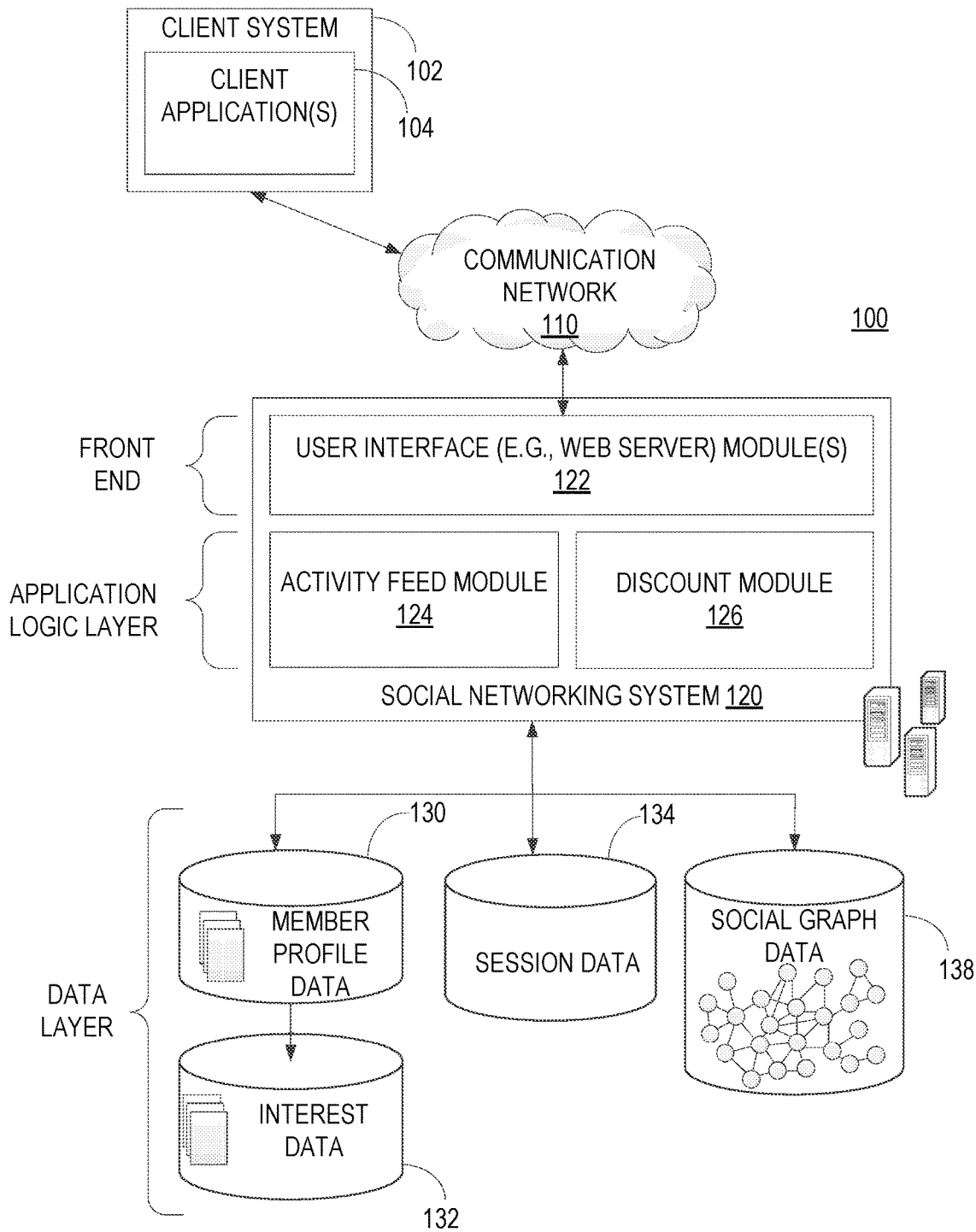
FIG. 1 is a network diagram depicting a client-server system that includes various functional components of a social networking system, in accordance with some example embodiments.

The present disclosure describes methods, systems, and computer program products for generating profile value scores for member profiles. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations, and combinations of the various features and elements described herein.

When a member logs into the social networking system, the social networking system creates a session for the member. Each session record stores the actions taken by the member during that session and the items viewed by the member during that session. Each session also include a time stamp, indicating when the session occurred.

One of the actions a member can take is to request an updated activity feed, wherein the activity feed a list of actions or items that have been taken or shared by other members of the social networking system. When a user requests an updated activity feed, the social networking system identifies a plurality of activity feed items or updates (e.g., updates to a members social graph or articles that a member has shared) based on a members interests and social graph data. For example, Member A is connected to Member B. When Member B shares an article on the social networking system, the social networking system will identify that activity as a activity feed item that is associated with Member A.

Once the social networking system has identified a list of potential activity feed items, the social networking ranks each activity feed item with a relevance score. The relevance score ranks a potential activity feed activity feed item based on a number of factors including the contention between the first member (e.g., the member who requested an updated activity feed) and the member from whom the potential activity feed activity feed item originates, the type of update (e.g., a connection update, an activity update, an article or other activity feed item, and so on), when the update was shared, and so on.

Once the list of activity feed items have been scored, the social networking system then generate a discount factor for each activity feed item. To generate a discount factor the social network determines a member associated with the activity feed item. The social networking system then determines an update display count for each member, wherein the update display count for a respective member is increased by one each time an update associated with the respective member was displayed in the activity feed of the requesting member during a previous session. In some example embodiments, the social networking system only considered updates that were displayed within a fixed time window. For example, the social networking system determines the number of times that updates from Member C were displayed to Member A (e.g., on Member A's activity feed) in the last 12 hours.

In some example embodiments, the discount factor is the calculated for each activity feed item based on the update display count for the member associated with each activity feed item. For example, Member D is associated with Activity feed item 5 and has an update display count of ten. Member F is associated with Activity feed item 7 and has an update display count of three. As such, the discount factor for Activity feed item 5 is likely to be much greater than the discount factor for Activity feed item 7, In other example embodiments, the discount factor is also partially determined based on the closeness of the two Members in the social graph data. For example, if Member B is determined to be closer (socially) to Member A than Member C, updates or posts associated with Member B will have a small discount factor than those from Member C, all else being equal.

FIG. 1 is a network diagram depicting a client-social networking system environment 100 that includes various functional components of a social networking system 120, in accordance with some example embodiments. The client-social networking system environment 100 includes one or more client systems 102 and a social networking system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, a client system 102 is an electronic device, such as a personal computer (PC), a laptop, a smartphone, a tablet, a mobile phone, or any other electronic device capable of communication with a communication network 110. The client system 102 includes one or more client applications 104, which are executed by the client system 102. In some example embodiments, the client application(s) 104 include one or more applications from a set consisting of search applications, communication applications, productivity applications, game applications, word processing applications, or any other useful applications. The client application(s) 104 include a web browser. The client system 102 uses a web browser to send and received requests to and from the social networking system 120 and displays information received from the social networking system 120.

In some example embodiments, the client system 102 includes an application specifically customized for communication with the social networking system 120 (e.g., a LinkedIn iPhone application). In some example embodiments, the social networking system 120 is a server system that is associated with a social networking service. However, the social networking system 120 and the server system that actually provides the social networking service may be completely distinct computer systems.

In some example embodiments, the client system 102 sends a request to the social networking system 120 for a webpage associated with the social networking system 120. For example, a member uses a client system 102 to log into the social networking system 120 and clicks a link to receive an updated activity feed from the social networking system 120. In response, the client system 102 receives the requested data (e.g., activity teed items in a particular order) and displays them on the client system 102.

In some example embodiments, as shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a social networking system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three-tiered architecture, the various example embodiments are by no means limited to this architecture.

As shown in FIG. 1, the front end consists of a user interface module (e.g., a web server) 122, which receives requests from various client systems 102 and communicates appropriate responses to the requesting client systems 102. For example, the user interface module(s) 122 may receive requests in the form of Hypertext Transport Protocol (HTTP) requests, or other web-based, application programming interface (API) requests. The client system 102 may be executing conventional web browser 106 applications or applications that have been developed for a specific platform to include any of a wide variety of mobile devices and operating systems.

As shown in FIG. 1, the data layer includes several databases, including databases for storing data for various members of the social networking system 120, including member profile data 130, interest data 132 (e.g., data describing the interests of one or more members of the social networking system 120), session data 134 (e.g., data describing the actions taken by the member in previous sessions and the data transmitted to the client system 102), and social graph data 138, which is data stored in a particular type of database that uses graph structures with nodes, edges, and properties to represent and store data. Of course, with various alternative example embodiments, any number of other entities might be included in the social graph (e.g., companies, organizations, schools and universities, religious groups, non-profit organizations, governmental organizations, non-government organizations (NGOs), and any other group) and, as such various other databases may be used to store data corresponding with other entities.

Consistent with some example embodiments, when a person initially registers to become a member of the social networking system 120, the person will be prompted to provide some personal information, such as his or her name, age (e.g., birth date), gender, contact information, home town, address, educational background (e.g., schools, majors, etc.), current job title, job description, industry, employment history, skills, professional organizations, memberships with other online service systems, and so on. This information is stored, for example, in the member profile data 130.

In some example embodiments, the member profile data 130 includes interest data 132. In other example embodiments, the interest data 132 is distinct from, but associated with, the member profile data 130. The interest data 132 stores data detailing one or more interests for members of the social networking system 120 including topics of interest to the member, hobbies, sports teams, companies, technology products, non-government organizations, search history, likes, follows, content rating, and so on. In some example embodiments, this information is only tracked with member permission.

The session data 134 stores data related to previous member sessions, including the actions the member took (e.g., what links the member clicked on, messages a member sent, and so on) and what was displayed to each member (e.g., what member posts or activity feed items were presented to the member). In some example embodiments, the session data 134 also includes a list of members whose content and/or posts have been presented to the member within a predetermined time period and a count indicating how many different posts were presented.

Once registered, a member may invite other members, or be invited by other members, to connect via the network service. A "connection" may include a bi-lateral agreement by the members, such that both members acknowledge the establishment of the connection. Similarly, with some example embodiments, a member may elect to "follow" another member. In contrast to establishing a "connection," the concept of "following" another member typically is a unilateral operation and, at least with some example embodiments, does not include acknowledgement or approval by the member that is being followed. When one member follows another, the member who is following may receive automatic notifications about various interactions undertaken by the member being followed. In addition to following another member, a member may elect to follow a company, atopic, a conversation, or some other entity, which may or may not be included in the social graph. Various other types of relationships may exist between different entities and are represented in the social graph data 138.

The social networking system 120 may provide a broad range of other applications and services that allow members the opportunity to share and receive information, often customized to the interests of the member, some example embodiments, the social networking service may include a photo sharing application that allows members to upload and share photos with other members. As such, at least with some example embodiments, a photograph may be a property or entity included within a social graph. With some example embodiments, members of a social networking service may be able to self-organize into groups, or interest groups, organized around a subject matter or topic of interest. In some example embodiments, the data for a group may be stored in a database. When a member joins a group, his or her membership in the group will be reflected in the organization interaction data, the member interaction data, and the social graph data 138.

In some example embodiments, the application logic layer includes various application server modules, which, in conjunction with the user interface module(s), generate various user interfaces (e.g., web pages) with data retrieved from various data sources in the data layer. With some example embodiments, individual application server modules are used to implement the functionality associated with various applications, services, and features of the social networking service. For instance, a messaging application, such as an email application, an instant messaging application, or some hybrid or variation of the two, may be implemented with one or more application server modules. Similarly, a search engine enabling members to search for and browse member profiles may be implemented with one or more application server modules. Of course, other applications or services that utilize an activity feed module 124 or a discount module 126 may be separately implemented in their own application server modules.

In addition to the various application server modules, the application logic layer includes an activity feed module 124 or a discount module 126. As illustrated in FIG. 1, with some example embodiments, the activity feed module 124 or the discount module 126 are implemented as services that operate in conjunction with various application server modules. For instance, any number of individual application server modules can invoke the functionality of the activity feed module 124 or the discount module 126. However, with various alternative example embodiments, the activity feed module 124 or the discount module 126 may be implemented as their own application server modules such that they operate as stand-alone applications. With some example embodiments, the activity feed module 124 or the discount module 126 include or have an associated publicly available API that enables third-party applications to invoke the functionality they provide.

Generally, the activity feed module 124 receives a request form a member to generate an updated activity feed when the user creates a new session with the social networking system 120. In some example embodiments, a new session is created whenever the member logs into the social networking system 120 after a period of non-interaction (e.g., the period may be a small amount of time such as 5 minutes).

Once member requests an updated activity feed the activity feed module 124 identifies a list of potential activity feed posts (e.g., posts from other members or descriptions of member activities) based on the member's social graph data 138, interest data 132 past activity e.g., which types of activity feed posts does the member respond to the most and so on). Once a list of potential activity feed posts are determines, the activity feed module 124 generates a relevance score for each potential post. In some example embodiments, the relevance score for a particular potential activity feed post is based the characteristics of the particular potential activity feed post and the characteristics of the member.

For example, the activity feed module 124 uses the data the particular potential activity feed post was made, whether other members connected to the requesting member liked or shared the post, whether the content of the post is associated with one or more known interests of the requesting member, and the strength of the social connection between the requesting members and the member who originally post the particular potential activity feed posts.

The activity feed module 124 will rank the list of potential activity feed posts based on the generated relevance scores. In some example embodiments, the top scoring potential activity feed posts are most likely to be displayed to the requesting member.

In some example embodiments, the discount module 126 generates a discount factor for each potential activity teed post. In some example embodiments, the discount factor is determined by identifying the member associated with each potential activity feed post. Once originating members are determined for each potential activity feed post, discount module 126 calculates the number of past session item views associated with that member.

Past session item views for a particular member represents is the number of times that an activity feed post originating from that particular member has been displayed in the activity feed of the requesting member in previous sessions. Thus, each time an activity feed post displayed to a member, the past session item view record is incremented by 1 for uses in determining discount factors in future sessions. In this way, the discount module 126 determines the number of times a particular member has had activity posts displayed in the past. In some example embodiments, only posts within a predetermined amount of time (e.g., twelve hours) are used when calculating past session item views for a given member.

The discount module 126 then uses the number of past session item views to determine a discount factor for each potential activity feed post in the list of potential activity feed post. In this way, a potential activity feed post from a member that has had associated activity teed posts displayed to the requesting member many times will have a bigger discount factor, all other things being equal.

In this way, the discount module 126 ensures that a requesting member sees activity feed posts from a variety of different members, even across multiple sessions.

Figure 2:
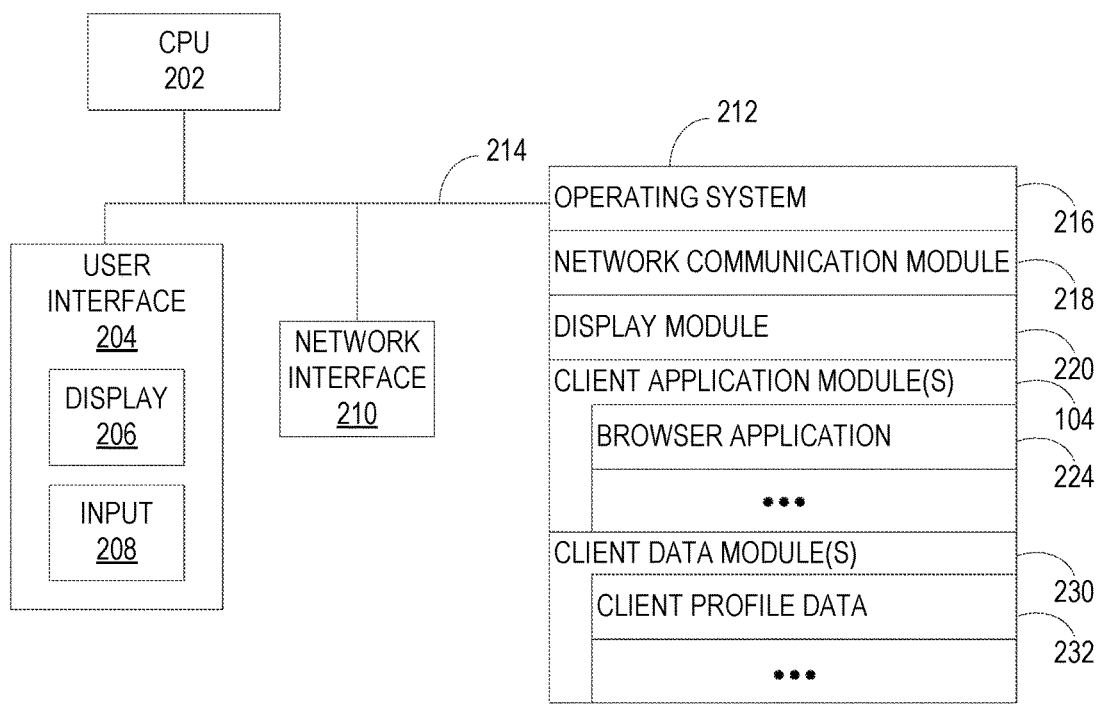
FIG. 2 is a block diagram illustrating a client system, in accordance with some example embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, some client systems 102 use a microphone and voice recognition to supplement or replace the keyboard.

Memory 212 includes high-speed random access memory, such as dynamic random-access memory (DRAM), static random access memory (SRAM), double data rate random access memory (DDR RAM) or other random access solid state memory devices; and may, include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately, the non-volatile memory device(s) within memory 212, comprise(s) a non-transitory computer-readable storage medium.

In some example embodiments, memory 212, or the computer-readable storage medium of memory 212, stores the following programs, modules, and data structures, or a subset thereof:
- an operating system 216 that includes procedures for handling various basic system services and for performing hardware-dependent tasks;
- a network communication module 218 that is used for connecting the client system 102 to other computers via the one or more communication network interfaces 210 (wired or wireless) and one or more communication networks 110, such as the Internet, other ANs, LANs, metropolitan area networks (MANs), etc.;
- a display module 220 for enabling the information generated by the operating system 216 and client application(s) 104 to be presented visually on the display device 206;
- one or more client applications 104 for handling various aspects of interacting with the social networking system 120 (FIG. 1), including but not limited to:
  - a browser application 224 for requesting information from the social networking system 120 (e.g., product pages and member information) and receiving responses from the social networking system 120; and
- client data module(s) 230 for storing data relevant to the clients, including but not limited to:
  - client profile data 232 for storing profile data related to a member of the social networking system 120 associated with the client system 102.

Figure 3:
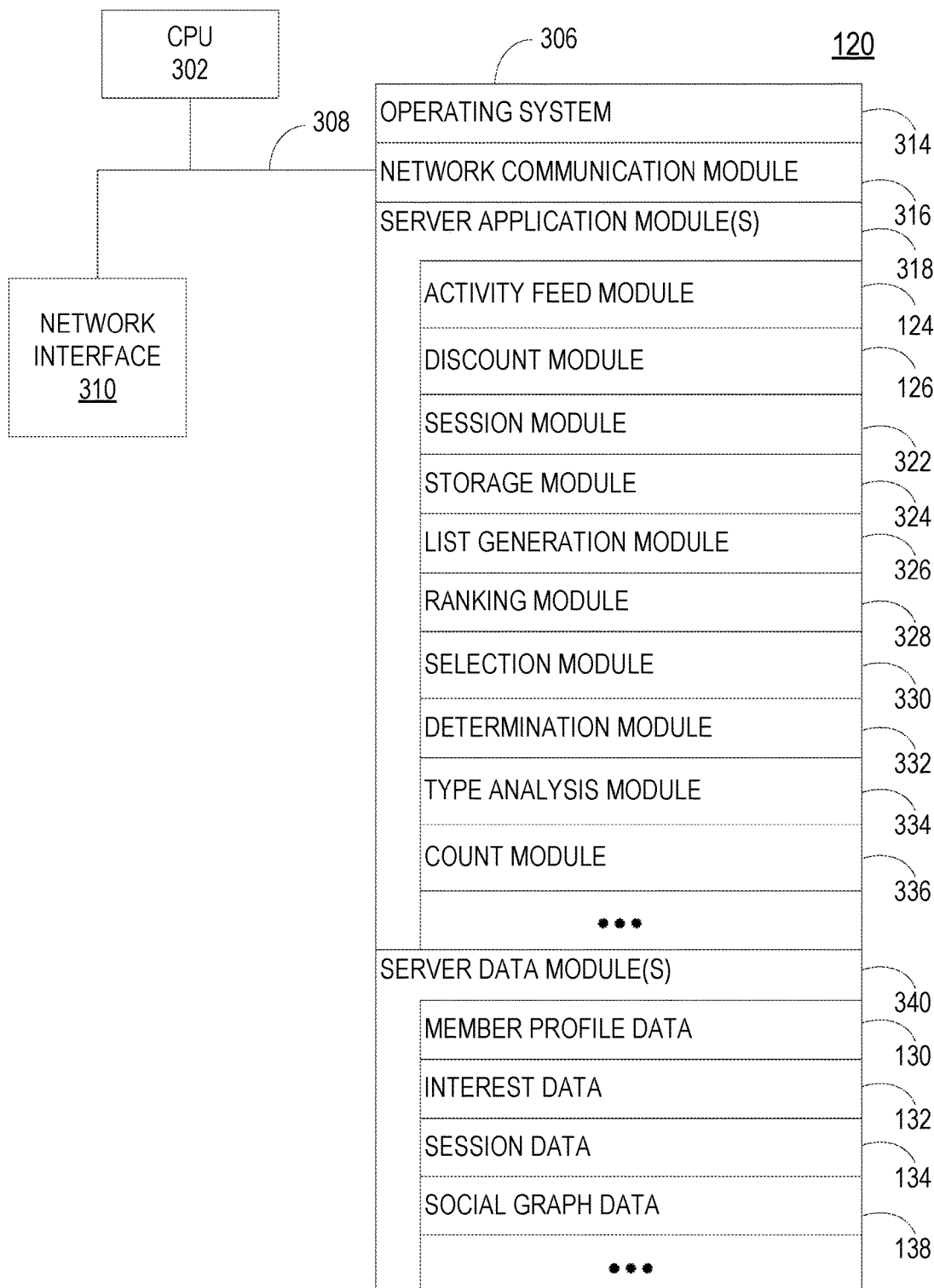
FIG. 3 is a block diagram illustrating a social networking system, in accordance with some example embodiments.

FIG. 3 is a block diagram further illustrating the social networking system 120, in accordance with some example embodiments. Thus, FIG. 3 is an example embodiment of the social networking system 120 in FIG. 1. The social networking system 120 typically includes one or more CPUs 302, one or more network interfaces 310, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises anon-transitory computer-readable storage medium. In some example embodiments, memory 306, or the computer-readable storage medium of memory 306, stores the following programs, modules, and data structures, or a subset thereof:
- an operating system 314 that includes procedures for handling various basic system services and for performing hardware-dependent tasks;
- a network communication module 316 that is used for connecting the social networking system 120 to other computers via the one or more communication network interfaces 310 (wired or wireless) and one or more communication network 110, such as the Internet, other WANs, LANs, MANs, and so on;
- one or more server application modules 318 for performing the services offered by the social networking system 120, including but not limited to:
  - an activity feed module 124 for, in response to a request for an updated activity feed, identifying potential activity feed posts, calculating relevance scores for each potential activity feed post, and ranking the potential activity feed post based on their respective relevance scores;
  - a discount module 126 for determines, for each potential activity feed post in a list of potential activity feed posts, how often posts from the same member or of the same type have been made in past member sessions (e.g., within a predetermine time frame) and then discounting the relevance scores for potential activity feed post based on the frequency with which posts from that member or of that type have been presented in past sessions;
  - a session module 322 for beginning and ending sessions and recording activities (including post views) that occur during each member session;
  - a storage module 324 for storing member profile data 130, interaction data associated with members of the social networking system 120, session data 134 (including what activities a member engages in a what posts they have viewed), and so on;
  - a list generation module 326 for generating a list of potential activity feed posts based on the requesting member profile data 130 and data describing the potential activity feed post;
  - a ranking module 328 for ranking a generated list of potential activity feed post based on associated relevance scores;

a selection module 330 for selecting one or more of a ranked potential activity feed posts for display in a requesting members activity feed;

a determination module 332 for determining whether a potential activity feed post has a high enough relevance score to be counted in a count of past session item views;

a type analysis module 334 for analyzing each potential activity teed post in a list of potential activity feed posts to determine the post of that potential activity feed post; and a count module 336 for determining or keeping track of a count of the number of times that posts from a particular member or of a particular type have appeared in a requesting members activity feed in past member sessions; and server data module(s) 340, holding data related to social networking system 120, including but not limited to:

member profile data 130 including both data provided by the member who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on member's activity, social graph data, overall trend data for the social networking system 120, and so on;

interest data 132 including data representing a member's stated or inferred interest in one or more topics;

session data 134 including data describing past member sessions including the actions that the member took and the content the member viewed (e.g., including the content type of the member originating the activity feed items); and social graph data 138 including data that represents members of the server system and the social connections between them.

Figure 4:
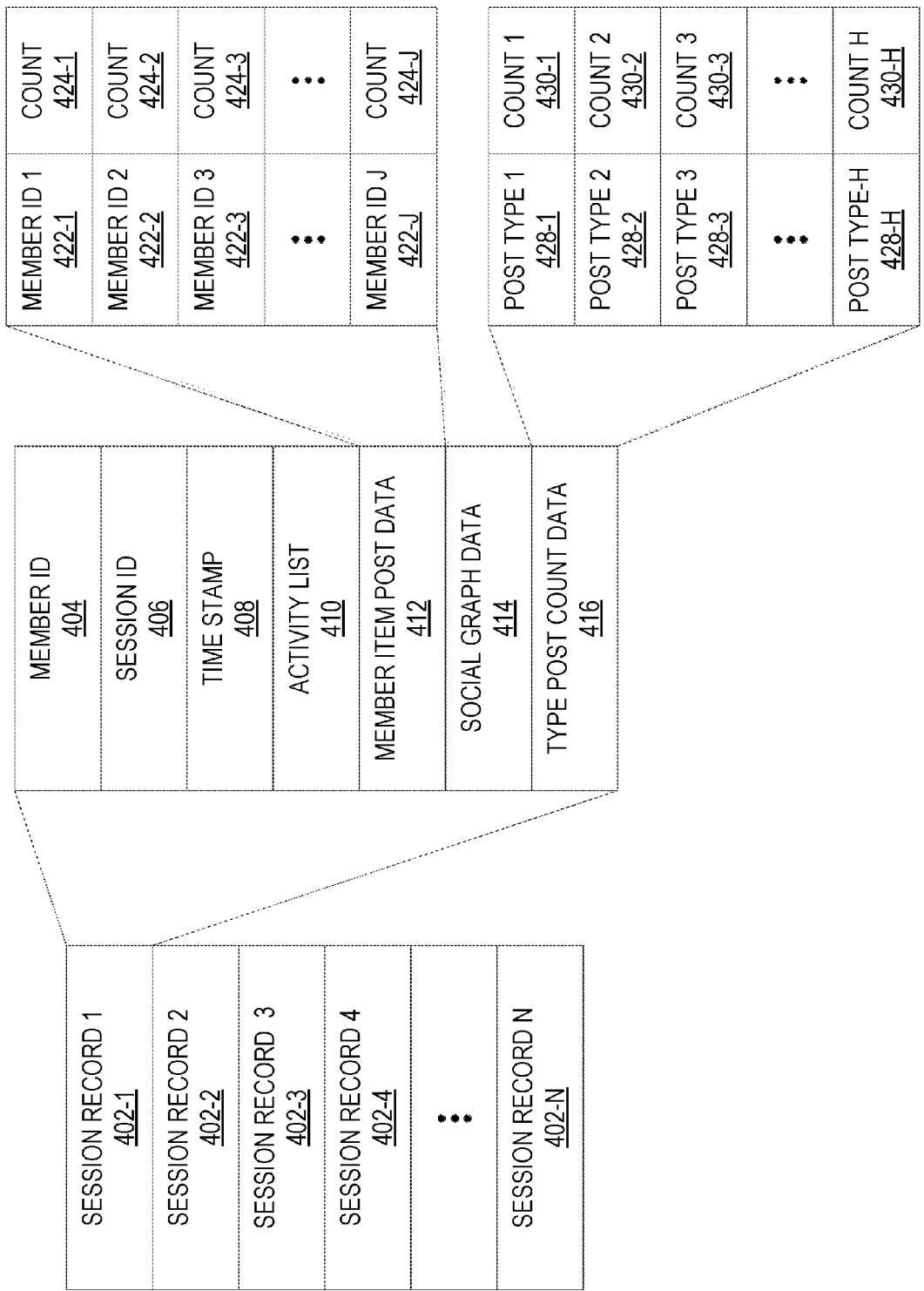
FIG. 4 depicts a block diagram of an exemplary data structure for the member profile data for storing member profiles, in accordance with some embodiments.

FIG. 4 depicts a block diagram of an exemplary data structure for the session data 134 for storing session records, in accordance with some embodiments. In accordance with some embodiments, the session data 134 includes a plurality of session records 402-1 to 402-N, each of which corresponds to a session of member with the social networking system (e.g., system 120 in FIG. 1). A session is a period of time in which a member is logged into and interacting with the server system (e.g., the server system 120 in FIG. 1).

In some embodiments, a respective session record 402 stores a unique member identifier (ID) 404 for the session record 402, a session ID that identifies particular session of the member with the server system (e.g., the server system 120 in FIG. 1), a time stamp 408 indicating when the session began and, in some embodiments, when the session ended, member item post data 412, social graph data 414, and type post count data 416.

In some embodiments, the member item post data 412 includes a list of member profile IDs (e.g., 422-1 to 422-J) that each represent a particular member who has had an activity item post displayed to the member 404 during the session to which the session record 402 corresponds. For example, if the member associated with the session record 402 viewed thirty posts during this session, then up to thirty member ids 422 would be listed.

In some example embodiments, each listed member id 422 includes a count 424. The count represents the number of items associated with the member id 422 that the member has viewed during the session 402.

In some embodiments, the member item post data 412 includes a list of post type records (e.g., 428-1 to 428-J) that each represent a particular post content type that has been displayed to the member 404 during the session to which the session record 402 corresponds. For example, if the member associated with the session record 402 viewed thirty posts during this session, then up to thirty member post types 428 would be listed.

In some example embodiments, each listed post type 428 includes a count 430. The count 430 represents the number of items associated with the post type 428 that the member has viewed during the session 402.

FIG. 5A is a block diagram of an exemplary data structure for the determining activity feed item relevance using records of activity feed items presented to the member in past data sessions, in accordance with some embodiments. FIG. 5A includes records of the activity feed items (e.g., items in an activity feed) that are presented to a member in each session (502, 506, and 510). FIG. 5A also includes a list of potential activity feed items being considered for presentation in the current session 514 (e.g., when the member requests an updated activity feed when logging into the server system (e.g., the server system 120 in FIG. 1). In this case, only sessions within the last 18 hours are considered.

Each session record (502, 506, and 510) includes a list of activity feed items (504-1 to 504-9, 508-1 to 508-9, and 516-1 to 516-9) that were presented to a member during the session. Although each session is shown to have a the same number of items in this example, the number of activity feed items shown in each session depends on the actions of the member (e.g., how many activity feed items the member requests/chooses to view) and thus can vary greatly from session to session.

In this example, each activity feed item is associated with a particular member of the server system (e.g., the server system 120 in FIG. 1). However, each activity feed item includes other data (e.g., activity feed item type, activity feed item ID, and so on) and the server system (e.g., the server system 120 in FIG. 1) can create activity feed item diversity using this other data as well.

The list of potential activity feed items being considered for display to the member during the current session 514 are then determined. The social networking system (e.g., system 120 in FIG. 1) determines the number of times the member associated with each of the activity feed items in the list of potential activity feed items has had a activity feed item displayed to a member in a previous session. For example, member L has an activity feed item 516-1 being considered for display in the current session. The social networking system (e.g., system 120 in FIG. 1) then determines the number of times an activity feed item associated with Member L is presented to the member in previous examples. In this example, activity feed items associated with Member L have been displayed four times (504-2, 504-9, 508-8, and 512-4).

The social networking system (e.g., system 120 in FIG. 1) can then calculate, for the member associated with each potential activity feed item, the number of times a activity feed item associated with that member has been presented to the member in previous sessions. Once this value is calculated the social networking system (e.g., system 120 in FIG. 1) can then calculate a discount factor for each potential activity feed item.

FIG. 5B is a block diagram of an exemplary data structure for the rearranging potential activity feed items based on a discount factor, in accordance with some embodiments. FIG. 5B includes records of the activity feed items (e.g., items that can be displayed as items in an activity feed such as updates, notifications, comments, articles, and so on) that are being considered for inclusion into a activity feed for a member.

FIG. 5B includes a first list of activity feed items, labelled the activity feed item original ranking 524, that lists the potential activity feed items (516-1 to 516-9) for inclusion into a activity feed of a member.

Each activity feed item in the list of activity feed items (516-1 to 516-9) has an associated initial relevance score 522. The initial relevance score is a representation of the degree to which each activity feed item is relevant to the member for whom the activity feed is being constructed. The initial relevance score 522 is determined based on a number of factors including, but not limited to, the relationship for the member associated with the activity feed item and the member for whom the activity teed is being generated, the topics or members discussed or included in the activity feed item, the level of contact between the member associated with the activity feed item and the member for whom the activity feed is being generated, the number of other activity feed items in the same session that are from the same member, and so on.

In addition, each particular activity feed item has an associated previous displayed count 520. The previous displayed count 520 represents the number of times that a activity feed item associated with the originating member of the particular activity feed item (e.g., the member who created or shared the activity feed item such that it is considered for activity feed of the requesting member) has been presented to the requesting member in past sessions. For example, if the member had two past sessions with 24 hours, and was shown twenty five different activity feed items, during those sessions. The social networking system (e.g., system 120 in FIG. 1) determines that there were four different activity feed items that were associated with Member L Thus, the social networking system (e.g., system 120 in FIG. 1) determines the previous displayed count to be four.

Using the previous displayed count 520, the social networking system (e.g., system 120 in FIG. 1) generates a discount factor 526. In this example, the discount factor is generated such that the discount factor for a particular activity feed item is equal to 1−(0.1)*previously displayed count 520 for that particular activity feed item. Other methods of generating a discount factor can be used.

Once the discount factor 526 has been calculated, the social networking system (e.g., system 120 in FIG. 1) generates a discounted relevance score 532 for each activity feed item. In this case the discounted relevance score 532 is generated by multiplying the initial relevance score 522 by the discount factor.

The activity feed items are then re-ranked into a activity feed item final ranking 530 order. The activity feed item final ranking 530 order is based on the discounted relevance score 532 associated with each activity feed item. The social networking system (e.g., system 120 in FIG. 1) can then present activity feed items to the member based on the determined final ranking order.

Figure 6:
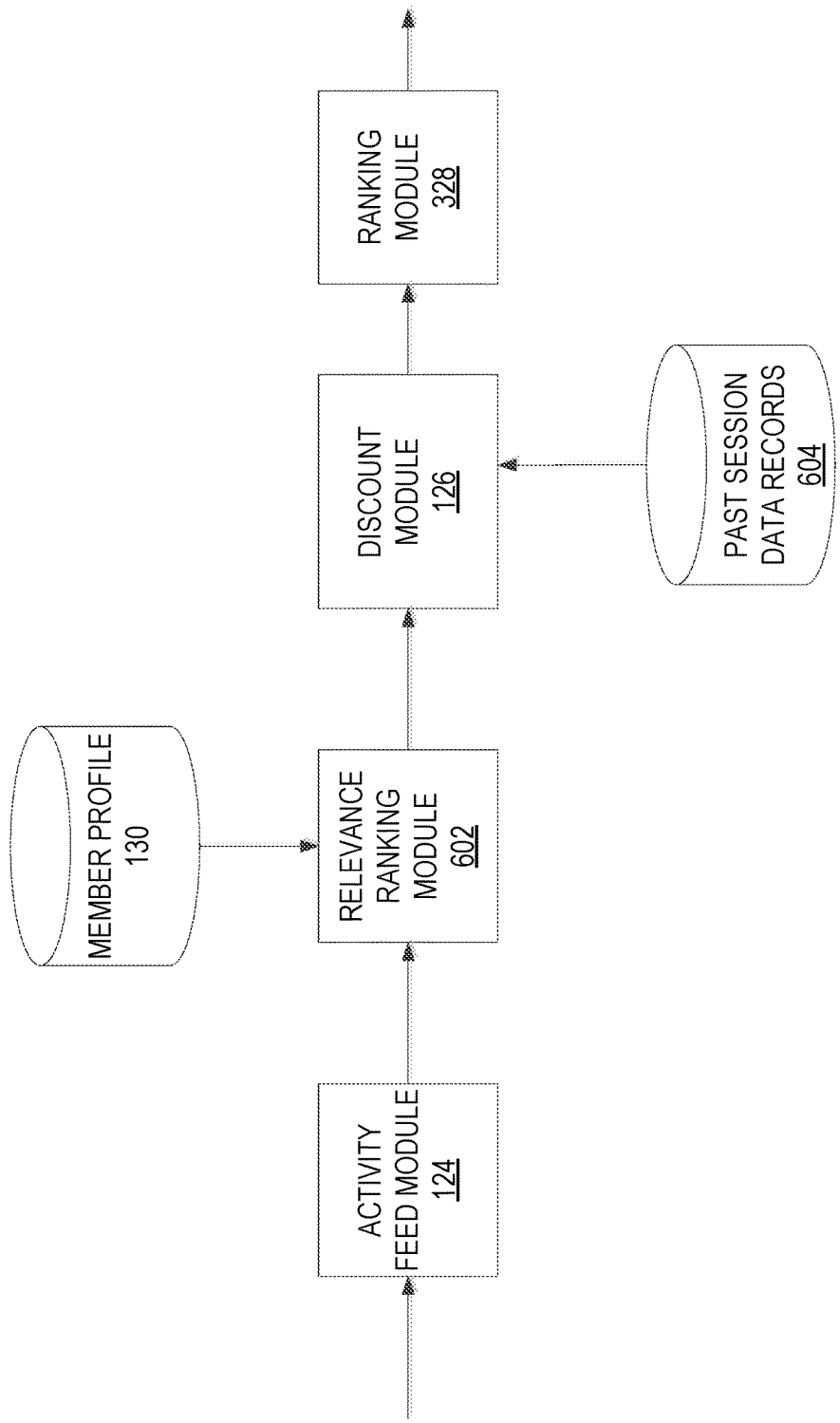
FIG. 6 is a block diagram illustrating an example arrangement of logical components in a system for increasing cross session diversity in accordance with some example embodiments.

FIG. 6A is a block diagram illustrating a system for increasing diversity in a member's activity feed over multiple member sessions, in some example embodiments.

In some example embodiments, the social networking system (e.g., system 120 in FIG. 1) receives an activity feed request from a member via a client system (e.g., the client system 102 in FIG. 1). The member logs into the social networking system (e.g., system 120 in FIG. 1) the social networking system (e.g., system 120 in FIG. 1) creates a member session. The created member session includes all activity during a specific period of member activity with the social networking system (e.g., system 120 in FIG. 1).

The activity feed module 124 accesses the request to determine the member for whom the activity feed update is requested. The activity feed module 124 then uses the member identification to identity a plurality of potential activity feed items for inclusion into presented activity feed. Once a list of potential activity feed items is identified, the list is sent to the relevance ranking module 602.

The relevance ranking module 602 accesses data stored in the member profile data 130 and uses it to evaluate each activity feed item for relevance to the member. For example, the relevance ranking module 602 determines the strength of the relationship between the requesting member and the member associated with each potential activity feed item.

Once each potential activity feed item has an associated relevance score, the discount module 126 determines, for each member associated with a activity feed item in the list of potential activity feed items, the number of a activity feed item associated with that member has been presented to the requesting member in past member sessions. To do this, the discount module 126 accesses the past session data records 604 which include a list of all the activity feed items presented to the member in past member sessions and the members associated with each presented activity feed item. In some example embodiments, the discount module 126 only accesses past data sessions for a predefined period of time. For example, the discount module 126 only includes data from member sessions that occurred within the past 24 hours. In this way, only recent sessions are considered when generated a discount factor.

The discount module 126 calculates a discount factor for each potential activity feed item based on the number of times that the associated member has had activity feed items displayed to the requesting member in past sessions. In other example embodiments, the discount factor is determined based the activity feed item type (e.g., connection notifications, articles, comments, and so on) or the specific item activity teed item (e.g., if the same activity feed item is being considered again).

In some example embodiments, the discount factor for a particular activity feed item scales linearly for each item presented in a previous session with the same source member. For example, if a activity feed item has 5 activity feed items with the same source member that have been displayed in the past sessions in the last 12 hours, the content would discounted more than a activity feed item that has 4 activity feed items with the same source member presented in sessions in the last 12 hours.

In other example embodiments, the discount factor scales such that lower counts receive relatively small discount factors and as the count rises quickly such that activity feed items with high previously viewed counts are highly discounted. In other example embodiments, activity feed items are grouped into one or more groups and then discounted based on the group in which the activity feed item is grouped into.

In some example embodiments, once a discount factor is determined, the discount module 126 calculates a discounted relevance score by multiplying the original relevance score by the discount factor.

In some example embodiments, the ranking module 328 then orders the potential contents based on the discounted relevance score. In some example embodiments, the ranking module 328 selects a predetermined number of activity feed items to be presented in an activity feed to the requesting member based on the ranked order of potential activity feed items.

Figure 7A:
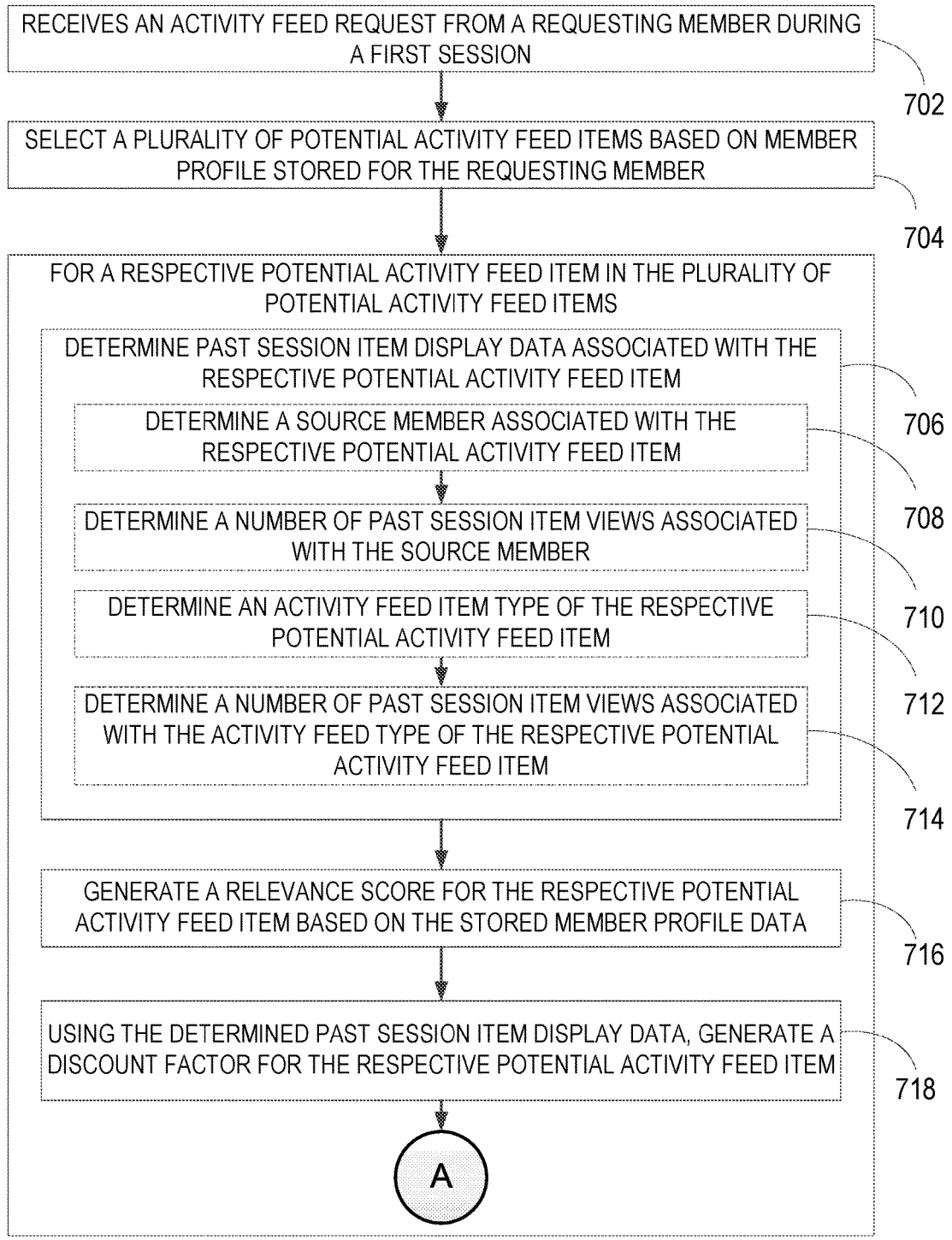

FIG. 7A is a flow diagram illustrating a method, in accordance with some example embodiments, for increasing diversity for activity feeds between sessions. Each of the operations shown in FIG. 5 may correspond to instructions stored in a computer memory or computer-readable storage medium. Optional operations are indicated by dashed lines (e.g., boxes with dashed-line borders). In some embodiments, the method described in FIG. 5 is performed by the social networking system (e.g., system 120 in FIG. 1). However, the method described can also be performed by any other suitable configuration of electronic hardware.

In some embodiments the method is performed at a social networking system (e.g., system 120 in FIG. 1) including one or more processors and memory storing one or more programs for execution by the one or more processors.

In some example embodiments, the social networking system (e.g., system 120 in FIG. 1) receives (702) an activity feed request from a requesting member during a first session. An activity feed request is a request to display an updated activity feed that is sent when a member attempts to load a page associated with the social networking system (e.g., system 120 in FIG. 1) that includes the activity feed.

In response to receiving the activity feed request, the social networking system (e.g., system 120 in FIG. 1) selects (704) a plurality of potential activity feed items based on member profile stored for the first member.

For a respective potential activity feed item in the plurality of potential activity feed items, the social networking system (e.g., system 120 in FIG. 1) determines (706) past session item display data associated with the respective potential activity feed item.

In some example embodiments, determines past session item display data includes, the social networking system (e.g., system 120 in FIG. 1) determining (708) a source member associated with the respective potential activity feed item. For example, Member A shares an article. The social networking system (e.g., system 120 in FIG. 1) records Member A as the source member for the article.

Using stored past session data, the social networking system (e.g., system 120 in FIG. 1) determines (710) a number of past session item views associated with the source member. For example, past session data includes a list of activity items displayed to the requesting members in past sessions. The social networking system (e.g., system 120 in FIG. 1) determines source members for each activity item and then determines the number of activity items associated with each source member.

In some example embodiments, the discount factor for a particular potential activity feed item is based on the number of past session item views associated with the source member.

In other example embodiments, determining past session item display data includes, for a respective potential activity feed item, the social networking system (e.g., system 120 in FIG. 1) determining (712) an activity feed item type of the respective potential activity feed item. Activity types include articles, comments, likes, new social connections, updates to a member profile (e.g., new job or school), and so on.

Using stored past session data, the social networking system (e.g., system 120 in FIG. 1) determines (714) a number of past session item views associated with the activity feed type of the respective potential activity feed item. In some example embodiments, the discount factor for a particular potential activity feed item is based on the number of past session item views associated with the activity feed type of the respective potential activity feed item. In other example embodiments, the discount factor for a particular potential activity feed item is based on the social graph connection between the requesting member and the source member.

In some example embodiments, the discount factor for a particular potential activity feed item is based on member interaction with content associated with the source member of the potential activity feed item. For example, if a member frequently clicks on, likes, shares, or otherwise interacts with activity feed items associated with a specific other member, the social networking system (e.g., system 120 in FIG. 1) will generally discount activity feed items associated with the specific other member less than activity feed items associated with members that the requesting member does not frequently interact with.

In some example embodiments, the discount factor is determined based on both the social graph relationship between the requesting member and the source member and the item type of the particular potential activity feed item.

In some example embodiments, determining past session item display data includes, for a respective potential activity feed item, determining a source member associated with the respective potential activity feed item. The source member is determined based on the specific member that caused the activity feed item to be considered for the activity feed. For example, if Member A is connected to Member B and Member B shares an article that was written by Member C, the source member would be Member B because it is Member B's relationship that causes the article to be considered for display in the activity feed of Member A.

The social networking system (e.g., system 120 in FIG. 1), using stored past session data, determines a number of past session item views associated with the source member. To do this, the social networking system (e.g., system 120 in FIG. 1) accesses past session data for the requesting member and counts the number of times that the source member has activity feed items that are displayed to the requesting member.

In other example embodiments, determining past session item display data includes for a respective potential activity feed item, determining an activity feed item type of the respective potential activity feed item. Activity type includes shares, likes, comments, posts, social graph data updates and so on.

Using stored past session data, the social networking system (e.g., system 120 in FIG. 1) determines a number of past session item views associated with the activity feed type of the respective potential activity feed item.

The social networking system (e.g., system 120 in FIG. 1) generates (716) a relevance score for the respective potential activity feed item based on the stored member profile data. Using the determined past session item display data, the social networking system (e.g., system 120 in FIG. 1) generates (718) a discount factor for the respective potential activity feed item. In some example embodiments, the discount factor for a particular potential activity feed item is based on the number of past session item views associated with the source member. In other example embodiments, the discount factor for a particular potential activity feed item is based on the number of past session item views associated with the activity feed type of the respective potential activity feed item.

FIG. 7B is a flow diagram illustrating a method, in accordance with some example embodiments, for increasing diversity for activity feeds between sessions. Each of the operations shown in FIG. 7B may correspond to instructions stored in a computer memory or computer-readable storage medium. Optional operations are indicated by dashed lines (e.g., boxes with dashed-line borders). In some embodiments, the method described in FIG. 7B is performed by the social networking system e.g., system 120 in FIG. 1). However, the method described can also be performed by any other suitable configuration of electronic hardware.

In some embodiments the method is performed at a social networking system (e.g., system 120 in FIG. 1) including one or more processors and memory storing one or more programs for execution by the one or more processors.

In some example embodiments, the social networking system (e.g., system 120 in FIG. 1) discounts 720) the relevance score based on the determined discount factor.

Once the discounted relevance scores are determined, the social networking system (e.g., system 120 in FIG. 1) orders (722) the plurality of potential activity feed items based on the discounted relevance score of each potential activity feed item. The potential activity feed items are then sent to the client system (e.g., the client system 102 in FIG. 1) in order of relevance.

Software Architecture

Figure 8:
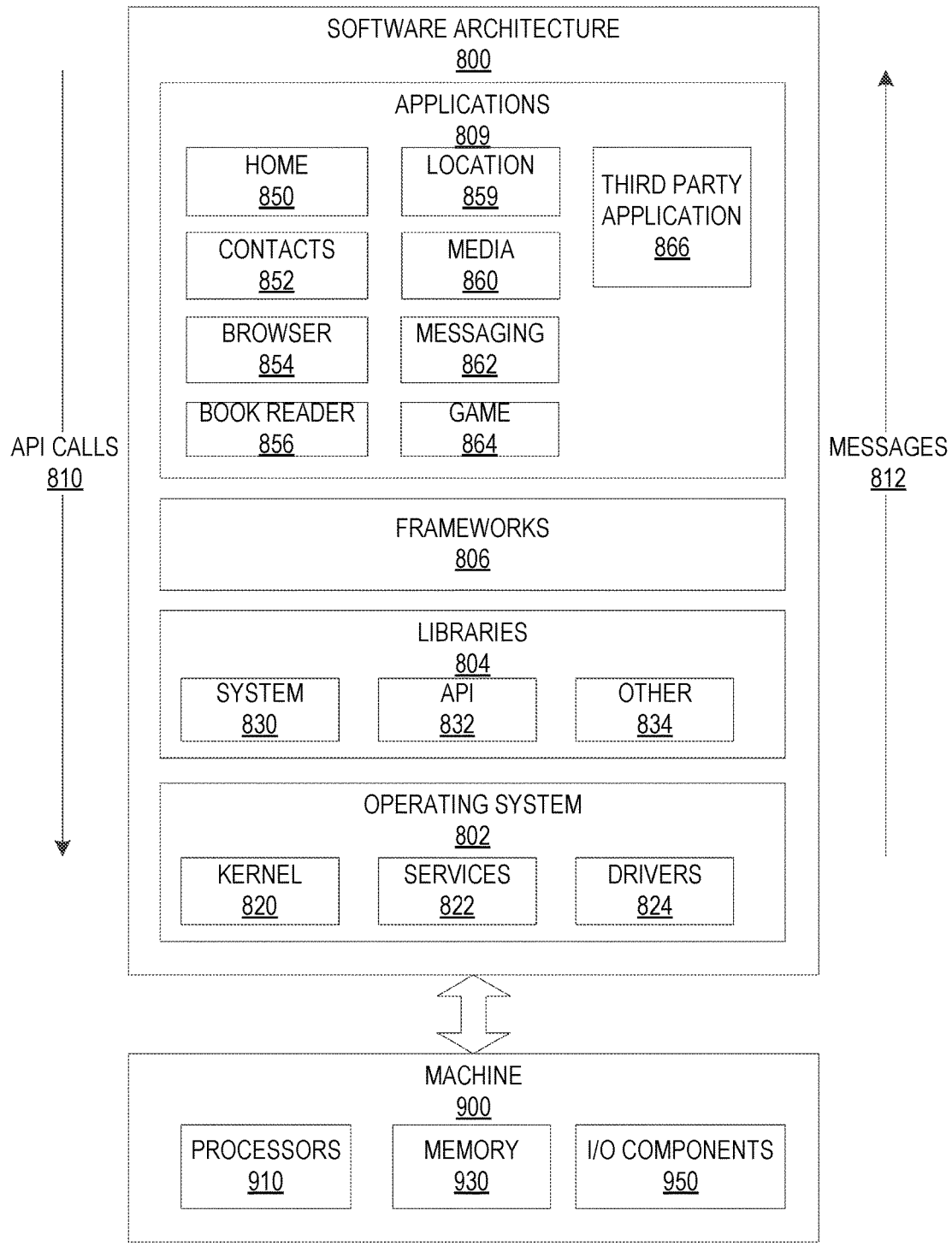
FIG. 8 is a block diagram illustrating an architecture of software, which may be installed on any one or more of devices, in accordance with some example embodiments.

FIG. 8 is a block diagram illustrating an architecture of software 800, which may be installed on any one or more of the devices of FIG. 1. FIG. 8 is merely a non-limiting example of an architecture of software 800 and it will be appreciated that many other architectures may be implemented to facilitate the functionality described herein. The software 800 may be executing on hardware such as a machine 900 of FIG. 9 that includes processors 910, memory 930, and I/O components 950. In the example architecture of FIG. 8, the software 800 may be conceptualized as a stack of layers where each layer may provide particular functionality. For example, the software 800 may include layers such as an operating system 802, libraries 804, frameworks 806, and applications 809. Operationally, the applications 809 may invoke API calls 810 through the software stack and receive messages 812 in response to the API calls 810.

The operating system 802 may manage hardware resources and provide common services. The operating system 802 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling and/or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 804 may provide a low-level common infrastructure that may be utilized by the applications 809. The libraries 804 may include system libraries 830 (e.g., C standard library) that may provide functions such as memory allocation functions, string manipulation functions, mathematic functions, and the like. In addition, the libraries 804 may include API libraries 832 such as media libraries e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 804 may also include a wide variety of other libraries 834 to provide many other APIs to the applications 809.

The frameworks 806 may provide a high-level common infrastructure that may be utilized by the applications 809. For example, the frameworks 806 may provide various graphical user interface (GUI) functions, high-level resource management, high-level location services, and so forth. The frameworks 806 may provide a broad spectrum of other APIs that may be utilized by the applications 809, some of which may be specific to a particular operating system 802 or platform.

The applications 809 include a home application 850, a contacts application 852, a browser application 854, a book reader application 856, a location application 859, a media application 860, a messaging application 862, a game application 864, and a broad assortment of other applications such as a third party application 866. In a specific example, the third party application 866 (e.g., an application developed using the Android™ or iOS™ software development kit (SDK) by an entity other than the vendor of the particular platform) may be mobile software running on a mobile operating system 802 such as iOS™, Android™, Windows® Phone, or other mobile operating systems 801. In this example, the third party application 866 may invoke the API calls 810 provided by the mobile operating system 802 to facilitate functionality described herein.

Example Machine Architecture and Machine-Readable Medium

Figure 9:
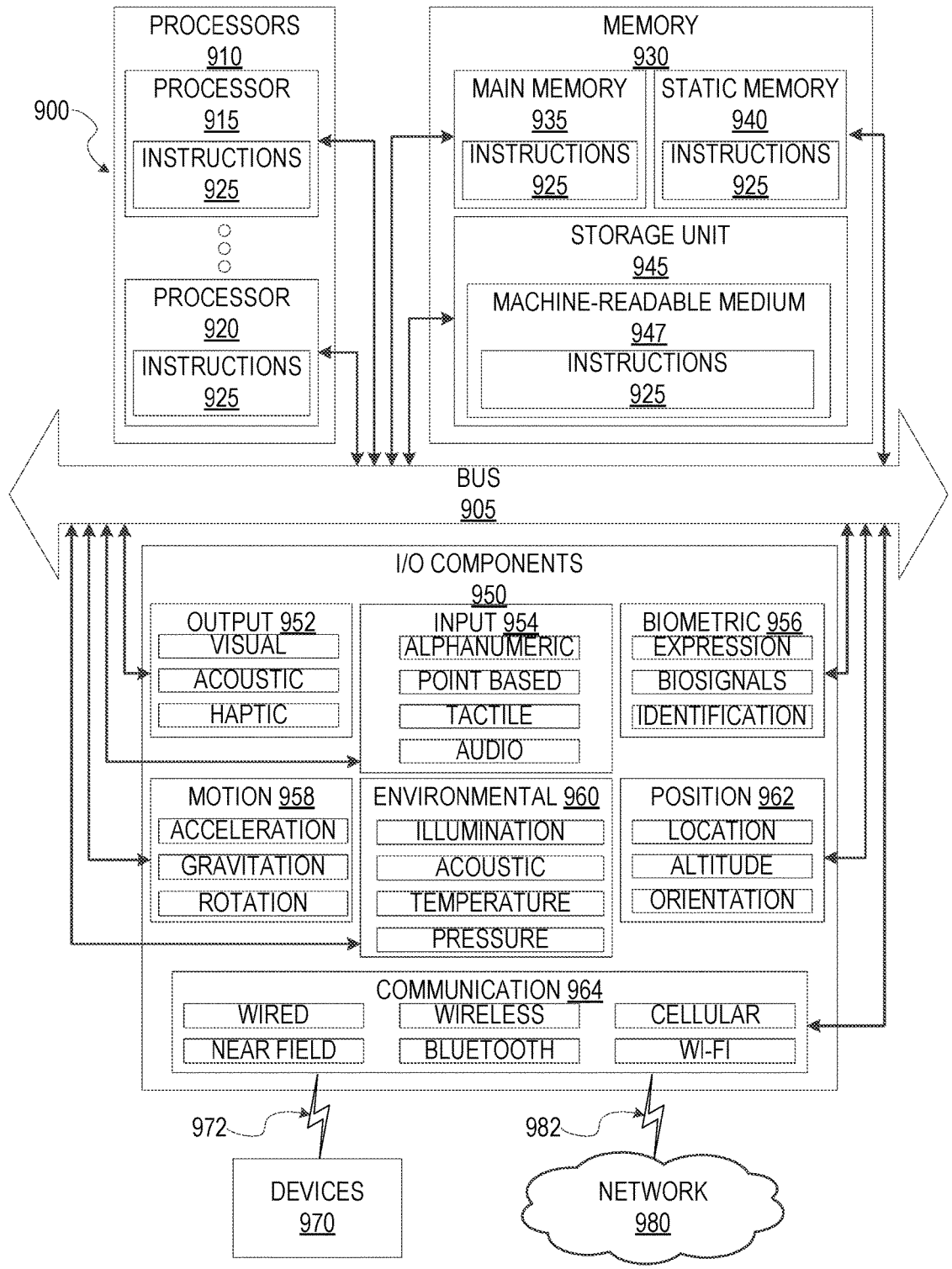
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 925 (e.g., software 800, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but be not limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by the machine 900. Further, while only a single machine 900 is illustrated, the term "machine" shall also be taken to include a collection of machines 900 that individually or jointly execute the instructions 925 to perform any one or more of the methodologies discussed herein.

The machine 900 may include processors 910, memory 930, and I/O components 950, which may be configured to communicate with each other via a bus 905. In an example embodiment, the processors 910 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 915 and a processor 920, which may execute the instructions 925. The term "processor" is intended to include multi-core processors 910 that may comprise two or more independent processors 915, 920 (also referred to as "cores") that may execute the instructions 925 contemporaneously. Although FIG. 9 shows multiple processors 910, the machine 900 may include a single processor 910 with a single core, a single processor 910 with multiple cores (e.g., a multi-core processor), multiple processors 910 with a single core, multiple processors 910 with multiple cores, or any combination thereof.

The memory 930 may include a main memory 935, a static memory 940, and a storage unit 945 accessible to the processors 910 via the bus 905. The storage unit 945 may include a machine-readable medium 947 on which are stored the instructions 925 embodying any one or more of the methodologies or functions described herein. The instructions 925 may also reside, completely or at least partially, within the main memory 935, within the static memory 940, within at least one of the processors 910 (e.g., within the processor's cache memory), or any suitable combination thereof, during execution thereof by the machine 900. Accordingly, the main memory 935, the static memory 940, and the processors 910 may be considered machine-readable media 947.

As used herein, the term "memory" refers to a machine-readable medium 947 able to store data temporarily or permanently and may be taken to include, but not be limited to, random-access memory (RAM), read-only memory (ROM, buffer memory, flash memory, and cache memory. While the machine-readable medium 947 is shown, in an example embodiment, to be a single medium, the term "machine-readable medium" should be taken to include a single medium or multiple media a centralized or distributed database, or associated caches and servers) able to store the instructions 925. The term "machine-readable medium" shall also be taken to include any medium, or combination of multiple media, that is capable of storing instructions (e.g., instructions 925) for execution by a machine (e.g., machine 900), such that the instructions 925, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 may include a wide variety of components to receive input, provide and/or produce output, transmit information, exchange information, capture measurements, and so on. It will be appreciated that the I/O components 950 may include many other components that are not shown in FIG. 9. In various example embodiments, the I/O components 950 may include output components 952 and/or input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instruments tactile input components (e.g., a physical button, a touch screen that provides location and force of touches or touch gestures, and/or other tactile input components), audio input components (e.g., a microphone), and the like.

In further example embodiments, the I/O components 950 may include biometric components 956, motion components 958, environmental components 960, and/or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components e.g., barometer), proximity sensor components (e.g., infrared sensors that detect nearby objects), and/or other components that may provide indications, measurements, and/or signals corresponding to a surrounding physical environment. The position components 962 may include location sensor components (e.g., a Global Position System (GPS) receiver component), altitude sensor components (e.g., altimeters and/or barometers that detect air pressure from which altitude may be derived), orientation sensor components e.g., magnetometers), and the like.

Communication may be implemented using a wide variety of technologies. The I/O components 950 may include communication components 964 operable to couple the machine 900 to a network 980 and/or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine 900 and/or any of a wide variety of peripheral devices (e.g., a peripheral device coupled via a USB).

Moreover, the communication components 964 may detect identifiers and/or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 964 such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 925 may be transmitted and/or received over the network 980 using a transmission medium via a network interface device (e.g., a network interface component included in the communication components 964) and utilizing any one of a number of well-known transfer protocols (e.g., HyperText Transfer Protocol (HTTP)). Similarly, the instructions 925 may be transmitted and/or received using a transmission medium via the coupling 972 (e.g., a peer-to-peer coupling) to the devices 970. The term "transmission medium" shall be taken to include any intangible medium that is capable of storing, encoding, or carrying the instructions 925 for execution by the machine 900, and includes digital or analog communications signals or other intangible media to facilitate communication of such software 800.

Furthermore, the machine-readable medium 947 is non-transitory (in other words, not having any transitory signals) in that it does not embody a propagating signal. However, labeling the machine-readable medium 947 as "non-transitory" should not be construed to mean that the medium is incapable of movement; the medium should be considered as being transportable from one physical location to another. Additionally, since the machine-readable medium 947 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]i" or "in response to detecting [the stated condition or event]," depending on the context.

The invention claimed is:

1. A method comprising:
   receiving an activity feed request from a first member during a first session;
   selecting a plurality of potential activity feed items based on data stored in a member profile associated with the first member;
   for a respective potential activity feed item in the plurality of potential activity feed items:
      determining past session item display data associated with the respective potential activity feed item,
      generating a relevance score for the respective potential activity feed item based on the stored member profile data;
      using the determined past session item display data, generating a discount factor for the respective potential activity feed item;
      discounting the relevance score based on the determined discount factor; and
   ordering the plurality of potential activity feed items based on the discounted relevance score of each potential activity feed item.

2. The method of claim 1, wherein determining past session item display data includes:
   for a respective potential activity feed item, determining a source member associated with the respective potential activity feed item; and
   using stored past session data, determining a number of past session item views associated with the source member.

3. The method of claim 1, wherein determining past session item display data includes:
   for a respective potential activity feed item, determining an activity feed item type of the respective potential activity feed item;
   using stored past session data, determining a number of past session item views associated with the activity feed type of the respective potential activity feed item.

4. The method of claim 2, wherein the discount factor for a particular potential activity feed item is based on the number of past session item views associated with the source member.

5. The method of claim 1, wherein the discount factor for a particular potential activity feed item is based on the number of past session item views associated with the activity feed type of the respective potential activity feed item.

6. The method of claim 2, wherein the discount factor for a particular potential activity feed item is based on the social graph connection between the requesting member and the source member.

7. The method of claim 2, wherein the discount factor for a particular potential activity feed item is based on member interaction with content associated with the source member of the potential activity feed item.

8. The method of claim 2, wherein the discount factor is determined based on both the social graph relationship between the requesting member and the source member and the item type of the particular potential activity feed item.

9. A system comprising:
   one or more processors;
   memory; and
   one or more programs stored in the memory, the one or more programs comprising instructions for:
      receiving an activity feed request from a first member during a first session;
      selecting a plurality of potential activity feed items based on member profile stored for the first member;
      for a respective potential activity feed item in the plurality of potential activity feed items:
         determining past sessions item display data associated with the respective potential activity feed item,
         generating a relevance score for the respective potential activity feed item based on the stored member profile data;

using the determined past session item display data, generating a discount factor for the respective potential activity feed item;

discounting the relevance score based on the determined discount factor; and ordering the plurality of potential activity feed items based on the discounted relevance score of each potential activity feed item.

10. The system of claim 9, wherein determining past session item display data includes:

for a respective potential activity feed item, determining a source member associated with the respective potential activity feed item; and using stored past session data, determining a number of past session item views associated with the source member.

11. The system of claim 9, wherein determining past session item display data includes:

for a respective potential activity feed item, determining an activity feed item type of the respective potential activity feed item;

using stored past session data, determining a number of past session item views associated with the activity feed type of the respective potential activity feed item.

12. The system of claim 10, wherein the discount factor for a particular potential activity feed item is based on the number of past session item views associated with the source member.

13. The system of claim 9, wherein the discount factor for a particular potential activity feed item is based on the number of past session item views associated with the activity feed type of the respective potential activity feed item.

14. The system of claim 10, wherein the discount factor for a particular potential activity feed item is based on the social graph connection between the requesting member and the source member.

15. The system of claim 10, wherein the discount factor for a particular potential activity feed item is based on member interaction with content associated with the source member of the potential activity feed item.

16. The system of claim 10, wherein the discount factor is determined based on both the social graph relationship between the requesting member and the source member and the item type of the particular potential activity feed item.

17. A non-transitory computer readable storage medium storing one or more programs for execution by one or more processors, the one or more programs comprising instructions for:

receiving an activity feed request from a first member during a first session;

selecting a plurality of potential activity feed items based on member profile stored for the first member;

for a respective potential activity feed item in the plurality of potential activity feed items:

determining past sessions item display data associated with the respective potential activity feed item, generating a relevance score for the respective potential activity feed item based on the stored member profile data;

using the determined past session item display data, generating a discount factor for the respective potential activity feed item;

discounting the relevance score based on the determined discount factor; and ordering the plurality of potential activity feed items based on the discounted relevance score of each potential activity feed item.

18. The non-transitory computer readable storage medium of claim 17, wherein determining past session item display data includes:

for a respective potential activity feed item, determining a source member associated with the respective potential activity feed item; and using stored past session data, determining a number of past session item views associated with the source member.

19. The non-transitory computer readable storage medium of claim 17, wherein determining past session item display data includes:

for a respective potential activity feed item, determining an activity feed item type of the respective potential activity feed item;

using stored past session data, determining a number of past session item views associated with the activity feed type of the respective potential activity feed item.

20. The non-transitory computer readable storage medium of claim 18, wherein the discount factor for a particular potential activity feed item is based on the number of past session item views associated with the source member.

* * * * *